United States Patent
Venturi et al.

(10) Patent No.: US 10,845,782 B2
(45) Date of Patent: Nov. 24, 2020

(54) METHOD FOR MONITORING AND CONTROLLING THE ENERGY COST FOR THE PRODUCTION OF A PRODUCT LOT

(71) Applicant: SIEMENS AKTIENGESELLSCHAFT, Munich (DE)

(72) Inventors: Giovanni Venturi, Genoa (IT); Elena Reggio, Genoa (IT); Simon Lepore, Genoa (IT)

(73) Assignee: SIEMENS INDUSTRY SOFTWARE S.R.L., Milan (IT)

( * ) Notice: Subject to any disclaimer, the term of this patent is extended or adjusted under 35 U.S.C. 154(b) by 18 days.

(21) Appl. No.: 16/246,671

(22) Filed: Jan. 14, 2019

(65) Prior Publication Data
US 2019/0219989 A1    Jul. 18, 2019

(30) Foreign Application Priority Data
Jan. 12, 2018   (EP) .................................... 18151476

(51) Int. Cl.
G05B 19/418   (2006.01)
G05B 19/4155  (2006.01)
G06Q 10/06    (2012.01)

(52) U.S. Cl.
CPC ..... *G05B 19/4155* (2013.01); *G06Q 10/0631* (2013.01); *G05B 2219/31414* (2013.01)

(58) Field of Classification Search
CPC ........................... G06Q 10/06; G05B 19/41805
USPC ....................................................... 700/117
See application file for complete search history.

(56) References Cited

U.S. PATENT DOCUMENTS

| | | | |
|---|---|---|---|
| 5,291,394 A * | 3/1994 | Chapman ......... | G05B 19/41865 705/7.26 |
| 7,020,594 B1 * | 3/2006 | Chacon ................. | G06Q 10/04 700/100 |
| 7,409,303 B2 | 8/2008 | Yeo et al. | |
| 2002/0178047 A1 * | 11/2002 | Or ......................... | G06Q 10/04 705/412 |
| 2004/0225649 A1 * | 11/2004 | Yeo ....................... | G01D 4/004 |
| 2005/0203655 A1 * | 9/2005 | Tsai ................. | G05B 19/41865 700/101 |
| 2010/0249978 A1 * | 9/2010 | Solimano .............. | G06Q 10/04 700/111 |

(Continued)

*Primary Examiner* — Suresh Suryawanshi
(74) *Attorney, Agent, or Firm* — Laurence Greenberg; Werner Stemer; Ralph Locher

(57) ABSTRACT

A method monitors the energy cost for the production of a product lot using a manufacturing execution system (MES) that enables the operator of a production facility to optimize the production process in terms of energy costs. The method includes a) executing a production process being scheduled and controlled by the MES to produce the product lot; b) for each individual production step measuring the energy consumption over the course of the execution of the individual production step; c) creating a data model within the MES that correlates production specific data and the energy consumption data related to the product lot; d) defining commands to manage the production specific data and the energy consumption data wherein the commands are web APIs; and e) evaluating the production specific data and the energy consumption data and creating an energy consumption profile for the production process related to the product lot.

9 Claims, 5 Drawing Sheets

(56) References Cited

U.S. PATENT DOCUMENTS

| | | | | |
|---|---|---|---|---|
| 2011/0040399 A1* | 2/2011 | Lu | ......................... | G05B 13/024 |
| | | | | 700/102 |
| 2013/0173663 A1* | 7/2013 | Piccazzo | ............ | G05B 19/4183 |
| | | | | 707/776 |
| 2013/0190913 A1* | 7/2013 | Lamparter | ........... | G05B 19/418 |
| | | | | 700/99 |
| 2014/0067105 A1* | 3/2014 | Reggio | ................. | G05B 15/02 |
| | | | | 700/97 |
| 2015/0105887 A1* | 4/2015 | Troy | ............... | G05B 19/41865 |
| | | | | 700/97 |
| 2016/0154913 A1* | 6/2016 | Altare | ................... | G06Q 10/06 |
| | | | | 703/13 |

* cited by examiner

METHOD FOR MONITORING AND CONTROLLING THE ENERGY COST FOR THE PRODUCTION OF A PRODUCT LOT

CROSS-REFERENCE TO RELATED APPLICATION

This application claims the priority, under 35 U.S.C. § 119, of European application EP 18151476.1, filed Jan. 12, 2018; the prior application is herewith incorporated by reference in its entirety.

BACKGROUND OF THE INVENTION

Field of the Invention

The invention relates to a method for monitoring and/or controlling the energy cost for the production of a product lot using a manufacturing execution system (MES). Most recently, the term manufacturing operation management (MOM) is more and more used to replace the term MES.

As defined by the Manufacturing Enterprise Solutions Association (MESA International), a MES/MOM system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." In addition, the ISA-95 standard describes in detail the meaningful resources that a manufacturing process has to consider in order to optimize and streamline the production process. The focus is in particular on the management of materials, equipment, tools and personnel.

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES/MOM products under its SIMATIC IT® product family.

In MES/MOM systems, up to now, the consumption of energy in form of electricity is not included among the standard resources that need to be simulated, scheduled, tracked and traced during the production process. Energy is typically taken into consideration, but all measurements, consumptions and costs are related to equipment and machinery operations and are computed separately from the production process. Therefore, the energy costs are indirectly related to products, thus spreading the global energy cost over the global production of a production facility. In particular, the production specific data and the energy consumption data are typically managed by separate systems that operate in different domains.

The production specific data usually rely on MOM/MES systems for an efficient planning, scheduling and execution of the production and are surely related to product lots. The energy consumption data are mainly recorded by tools/sensors that retrieve the energy consumption at equipment basis. This means that energy consumption data are related to machineries and equipment, but not for a specific product lot. Thus, energy consumption is typically calculated for the production line in a given period without any direct relation to the product lot and the specific production step. The above-mentioned approach hardly enables the operator of the production facility to optimize the energy consumption together with the other resource usage for the execution of the various production processes.

Up to now, the typical way to correlate production specific data with energy consumption data is the setup of a team of experts that analyze the energy consumption measurements and the production specific data in a determined time period, and then plan some optimizations in the production process to increase the efficiency. This kind of process has a couple of disadvantages, such as rigidity, non-repeatability, high expenses. This process further lacks any link with real time constraints and can achieve therefore only limited results.

SUMMARY OF THE INVENTION

It is therefore the objective of the present invention to provide a method for monitoring and/or controlling the energy cost for the production of a product lot using a manufacturing execution system (MES) that enables the operator of a production facility to optimize the production process in terms of energy consumption and energy cost, too.

This objective is achieved according to the present invention by a method for monitoring and/or controlling the energy cost for the production of a product lot using a manufacturing execution system. The method includes the steps of:

a) executing a production process being scheduled and controlled by the manufacturing execution system to produce the product lot, the production process having a number of scheduled production steps;

b) for each individual production step measuring the energy consumption over the course of the execution of the individual production step for this specific product lot;

c) creating a data model within the manufacturing execution system that correlates production specific data and the energy consumption data related to this product lot;

d) defining commands to manage the production specific data and the energy consumption data wherein the commands are designed as web APIs, preferably as RESTful web APIs; and e) evaluating the production specific data and the energy consumption data and creating an energy consumption profile for the production process related to this produced product lot.

The method therefore allows correlating the production specific data and the energy consumption data of a specific product lot during the execution of the production process. Energy consumption data is now available at production step level for the specific product lot. The data model allows correlating exactly this production specific data and the energy consumption data via ODATA, demanding this information relative to energy consumption via the same MES routes as the other production specific data is retrieved.

In order to optimize the production process in terms of the necessary consumption of energy during its execution, the energy consumption profile can be compared to an energy cost profile. The energy cost profile can be supplied for example from an energy supplier or can be negotiated among a group of energy suppliers. Advantageously, a production scheduler may use the result of the comparison in order to adjust the scheduled order of at least one production step. Energy-intensive production steps can be for example coordinated within the production facility in order to avoid consumption peaks and/or to consume energy at low cost intervals and/or to produce large product lots in one throw.

Further, the energy consumption data may be linked to the production specific data thereby determining the energy cost for the production of the product lot. The production specific data may contain as an example the identification of the equipment on which the product lot has been processed and the usage period of this equipment. According to the data model, the system provides a mechanism to query the energy consumption monitoring unit/sensor to deliver the amount of energy consumed during this usage period for this specific product lot.

In order to institutionalize this correlation of production specific data and energy consumption data, it may be advantageous when an energy and resource management system (ERMS) is provided as a self-consistent application that is embedded in the manufacturing execution system. This app could also run stand-alone being enabled to access the data via http which dramatically simplifies the integration of the ERMS. Further, the energy and resource management system (ERMS) may process as input data the production specific data at runtime and the energy data retrieved from sensors logically connected to the production resources involved in the production steps and outputs an ordinated data set of the production specific data and the energy consumption data associated to the specific product lot for each production step.

In order to achieve the knowledge on the production resources that are involved in a specific production step, the manufacturing execution system may provide the information which production resources are involved in a specific production step. The data model may allow here to query the Product Segments (production step according to ISA-S95) that are required for the production of the product lot.

Further, according to the present invention, a computer program product is claimed that performs steps of the method.

Other features which are considered as characteristic for the invention are set forth in the appended claims.

Although the invention is illustrated and described herein as embodied in a method for monitoring and controlling the energy cost for the production of a product lot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
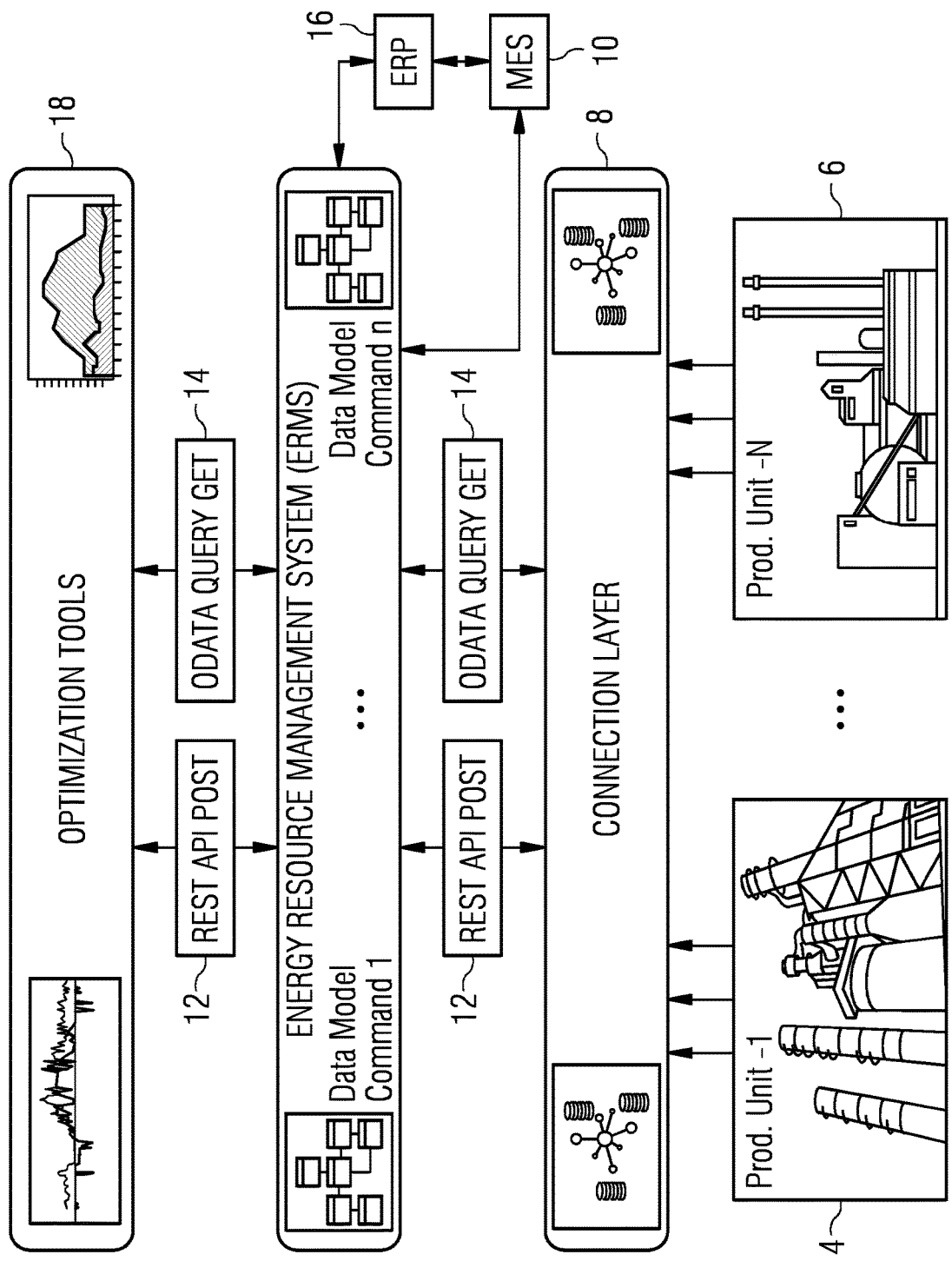
FIG. 1 is an illustration showing architecture for an energy resource management system (ERMS) within an industrial cluster scenario.

The present invention lays in the technical field of manufacturing execution systems (MES/MOM). By way of non-limiting example, reference will be made to the architecture of the SIMATIC IT Unified Architecture Foundation (in short, SIT UAF) product of Siemens Corporation.

SIMATIC IT Unified Architecture Foundation is a platform for creating an integrated MES/MOM ecosystem, targeting the current and future transformational technologies that are shaping the future of manufacturing: mobile internet, automation of knowledge work, the Internet of Things, and the Cloud. At the core of SIT UA Foundation is a unified manufacturing operations data bus that provides a common backbone for the integration of legacy applications while providing the first fundamental step towards a unified integrated system.

In a nutshell, SIT UAF is:

a) the platform approach to creating a Manufacturing Operations Management strategy;

b) the core element for executing, tracking and monitoring production progress and performance; and c) the data bridge between PLM and Shop Floor Automation, to create the Digital Enterprise.

SIT UAF is constructed around Domain Driven Design (DDD). Application data, services and events are defined by a model setting out the application structure and exposed as meta-data at any layer. SIT UAF includes common MOM components and services for connecting external systems, aggregating and exposing data, defining plant models and connecting the underlying automation data and systems. An overview of the product can be found in the document "SIMATIC IT Unified Architecture Foundation", available on the website www.siemens.com.

The present invention now provides a solution for considering the energy consumption of a production facility/line with respect to a specific product lot as a direct component of the production thereby providing an automated instance that correlates all data relevant for the determination of the energy consumption in a flexible and repeatable way.

For its realization, a specific data model has been designed and implemented that correlates the production data and the energy consumption data as well as the algorithms to expose the information to an optimization tool (if any). The data model and the algorithms form a software application that is hereinafter referred to as an energy resource management system (ERMS). The ERMS defines the framework infrastructure, the data model and the set of commands to manage the data. The ERMS is a self-consistent application that can be used stand-alone or embedded in the Manufacturing Execution System (as mentioned above) of a production facility.

The input data for the ERMS are:
i) run time production and energy data retrieved from sensors connected to a production line and its resources resp.;
ii) product lot information provided from a Manufacturing Execution System or a surrounding system, such as an ERP (enterprise resource planning system), or from a dedicated interface; and
iii) energy cost profile provided by a third party system, such as a cost table from an energy supplier.

The output data of the ERMS are the processed data sets of production and energy data associated to a given production lot for each production step. Typically, the ERMS outputs feed optimization tools to manage the production, in particular to plan and schedule production steps to achieve the best energy efficiency and/or to produce at the lowest energy cost.

The data model is conceived to set the production data, the resource data and the energy fluctuation into a programmed relationship. The interoperability of the data model is guaranteed by a set of commands that manage the correlated data and by a framework that can be queried. In the implementation disclosed in these examples, the commands are RESTful web APIs and the queries are executed via ODATA, simplifying dramatically the integration into the Manufacturing Execution System (MES or MOM).

An ERMS framework 2 according to the example shown in FIG. 1 is integrated in the MES system for controlling production lines 4 and 6 (here columns in the petrochemical industry). The production lines 4 to 6 are managed by local automation systems, such as Simatic®, WinCC®, Teamcenter® and PCS-7® which are TIA portal products of Siemens Aktiengesellschaft. The production lines 4, 6 are connected to a connection layer 8 which manages the flow of data according to the defined data model. The ERMS 2 is connected via RESTful web APIs 12 and other data query commands 14 to the connection layer 10. The ERMS 2 contains a direct link to the MES 10 and an ERP system 16 (such as SAP). Further, the ERMS 2 is connected to an optimization tool 18 which is enabled to recalculate the order of the production process according to predefined optimization criteria, such as delivery date, resource availability, energy cost and the like. Results of the optimization tool 18 can be evaluated in both the ERP system 16 and the MES 10, such as rescheduling of production activities.

The data model for the product lot-wise reflection of the energy cost provides an entire entity/relationship structure that is suitable for most of the possible requirements of an external application. In the following the data model is described in more detail by describing the entities and their relationships logically grouped in three main clusters:
i) Equipment model view: provides the definition of the physical hierarchy of the production resources, defining equipment and utilities (such as sensors, meters, etc.);
ii) Production model view: provides a snapshot of the runtime production data;
iii) Cluster model view: simply describes how a cluster of production lines is related to the physical plants and how they will collaborate among each other.

Figure 2:
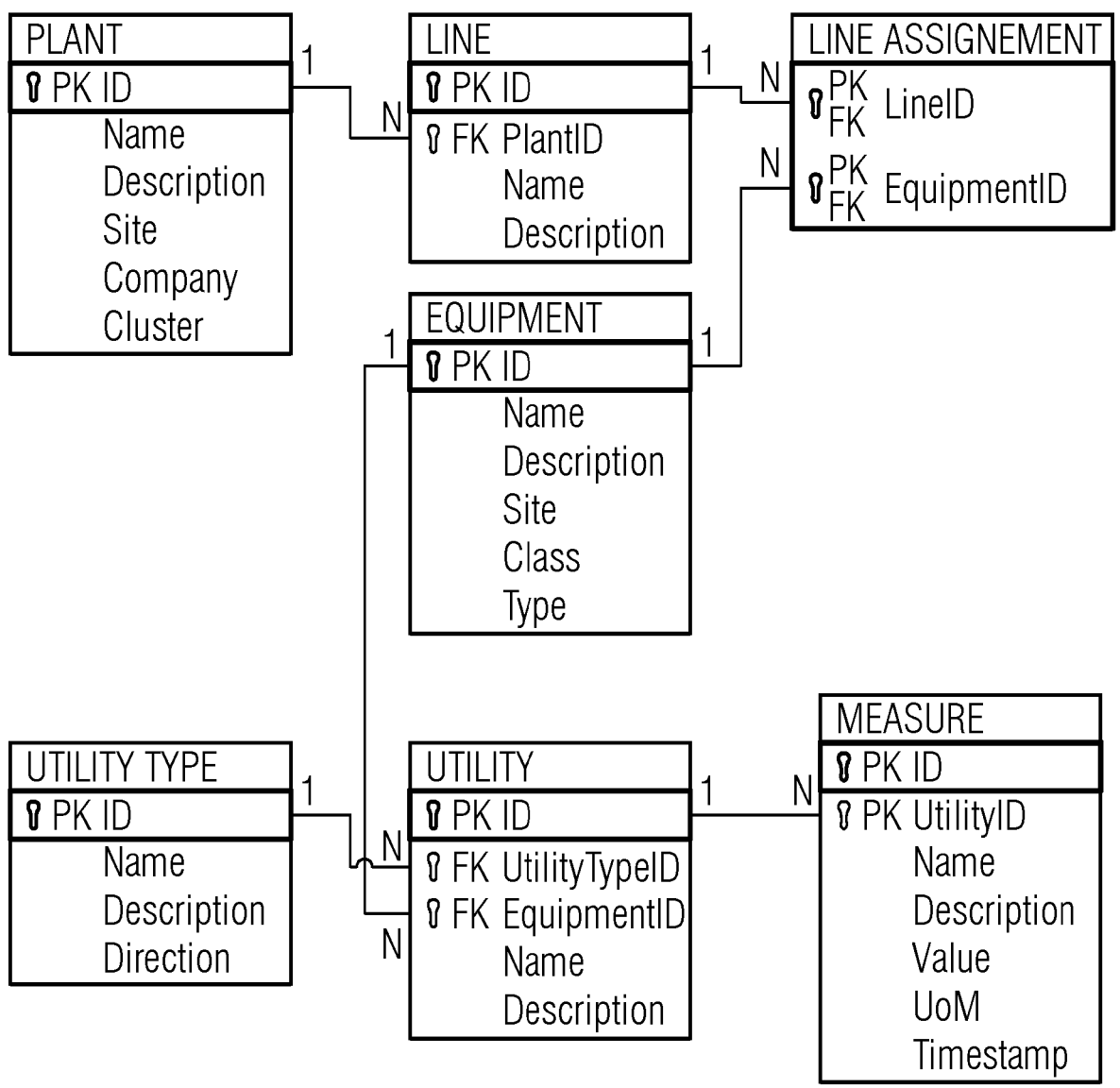
FIG. 2 is an illustration showing an entity/relationship diagram for an equipment model view on a data model of the energy resource management system.

FIG. 2 schematically shows an entity/relationship diagram for an equipment model view on the data model of the energy resource management system ERMS 2. This view explains the design of the involved entities and describes how they are connected to each other. In particular:
PLANT represents the production unit;
LINE defines the logical/physical cluster of equipment that is inside a production unit;
LINE ASSIGNMENT represents the link between LINEs and the equipment therein;
EQUIPMENT defines the production and power equipment that are part of the LINE in a production unit (PLANT);
UTILITY represents any utility, linked to an unit of EQUIPMENT that can perform measurements;
UTILITY TYPE defines the type of UTILITY and comprises the general specification of the UTILITY (i.e. flow meter, temperature meter, current meter, pressure meter etc.); and
MEASURE represents the runtime measurement collected by the available sensors in the UTILITIES. This might be a calculation already derived that is performed by the optimization tool 18.

Figure 3:
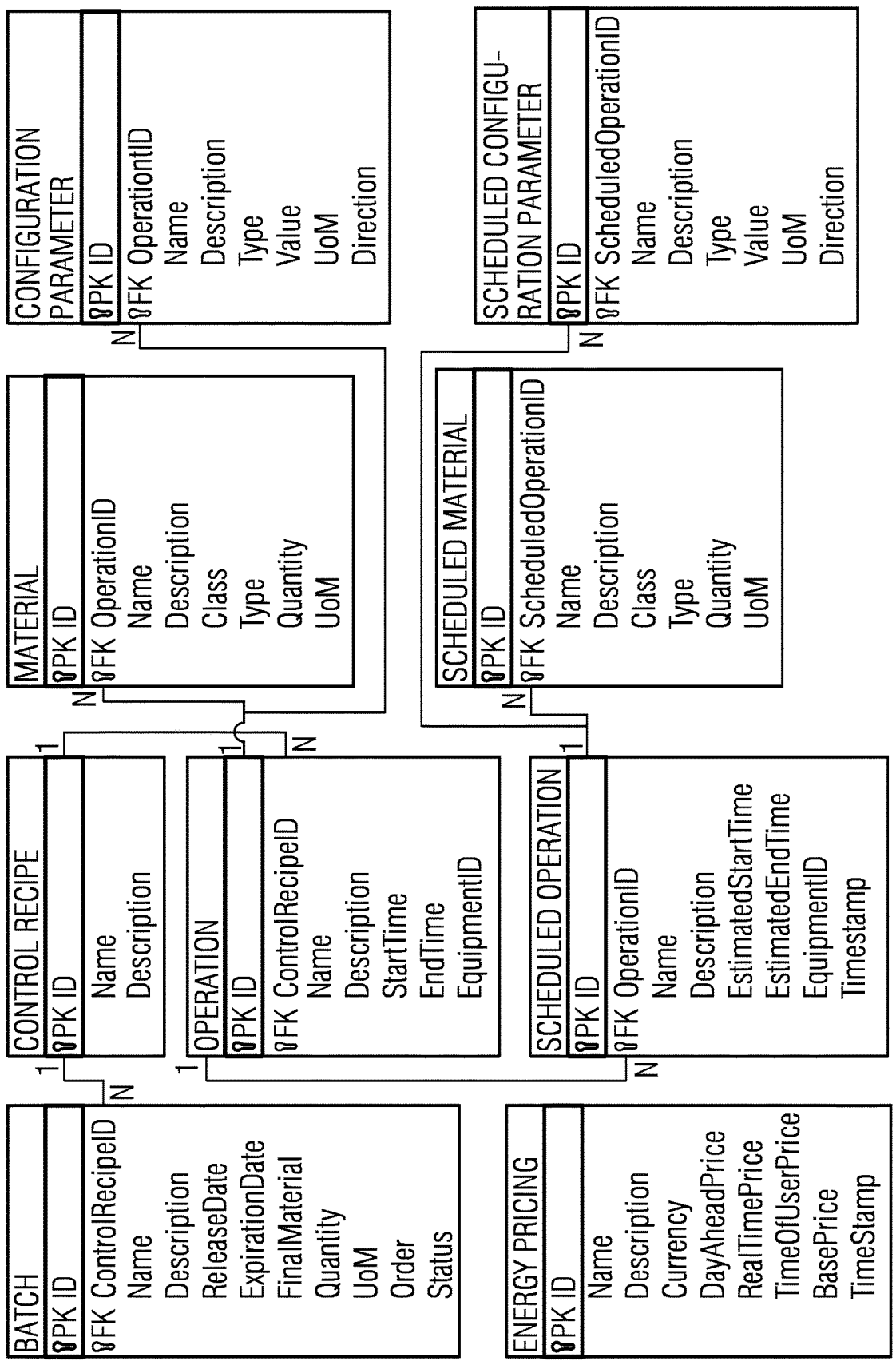
FIG. 3 is an illustration showing an entity/relationship diagram for a production model view on the data model of the energy resource management system.

FIG. 3 schematically shows an entity/relationship diagram for a production model view on the data model of the energy resource management system. Again, this diagram provides the design of the involved entities and describes how they are connected to each other. In particular:
BATCH represents the main element of the production operations; with other words the product lot to be produced;
CONTROL RECIPE defines the recipe used to produce the final material/product;
OPERATION represents the production step that is performed into a piece of EQUIPMENT in the production unit;
MATERIAL defines the input and/or output materials managed in the OPERATION; MATERIAL represents the runtime entity that indicates the material actually consumed or produced with its quantity and the related UTILITY of MEASURE;
CONFIGURATION PARAMETER represents the production step parameters, which are related to the production operations and/or to the resources/machines;
SCHEDULED OPERATION is linked to the OPERATION entity, it is an entity where the optimization tool can host its results and/or its calculations during a learning phase (data collection phase);
SCHEDULED MATERIAL is linked to the SCHEDULED OPERATION entity, it is an entity where the optimization tool can store its outcomes according to the SCHEDULED OPERATION;
SCHEDULED CONFIGURATION PARAMETER is linked to the SCHEDULED OPERATION entity, it is an entity where the optimization tool can store its outcomes according to the SCHEDULED OPERATION; and
ENERGY PRICING provides an entity the energy rates offered "day-by-day" by the energy provider as an energy supplier of the production unit.

Figure 4:
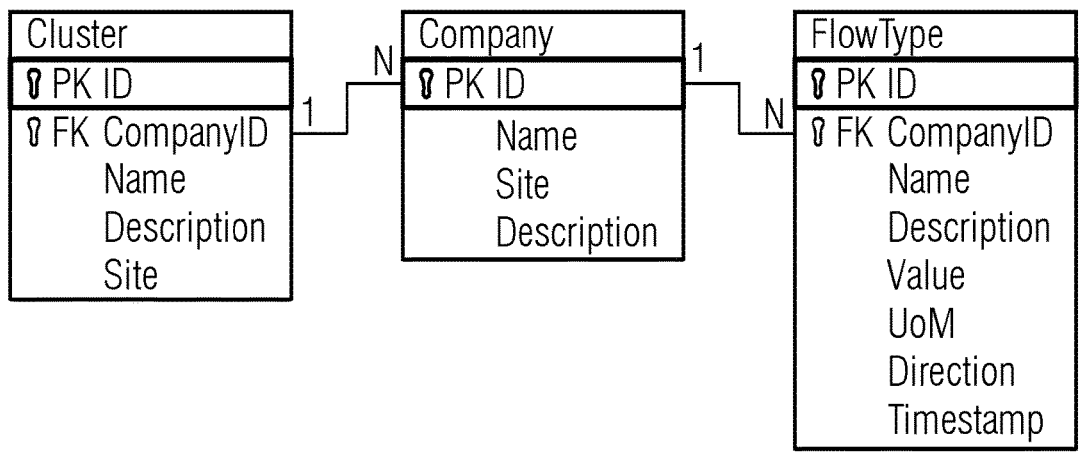
FIG. 4 is an illustration showing an entity/relationship diagram for a cluster model view on the data model of the energy resource management system.

FIG. 4 schematically represents an entity/relationship diagram for a cluster model view on the data model of the energy resource management system. In particular:
CLUSTER represents a set of companies that might be grouped in a cluster, in an energy/resources symbiosis based on the possible interconnection they could have among each other;
COMPANY defines the company that owns the production unit (PLANT); and
FLOW TYPE represents the possible interconnections between the companies in a cluster. Flow type entity models the connections and resources involved without detailing their type or nature.

Commands are used to manage the data flow within these data models. The commands are services that comprise the business logic to correlate and expose data according to the needs of an external application. Each command contains an interface and its specific implementation what is called the command handler. The business logic is implemented at command handler level and not at database level. When a command is invoked, the proper command handler is executed within a hosting process called worker. Each worker can simultaneously execute different commands. Commands can be called from the web or from a command handler. They are basic services to be inside any complex Service Oriented Architecture (SOA).

Figure 5:
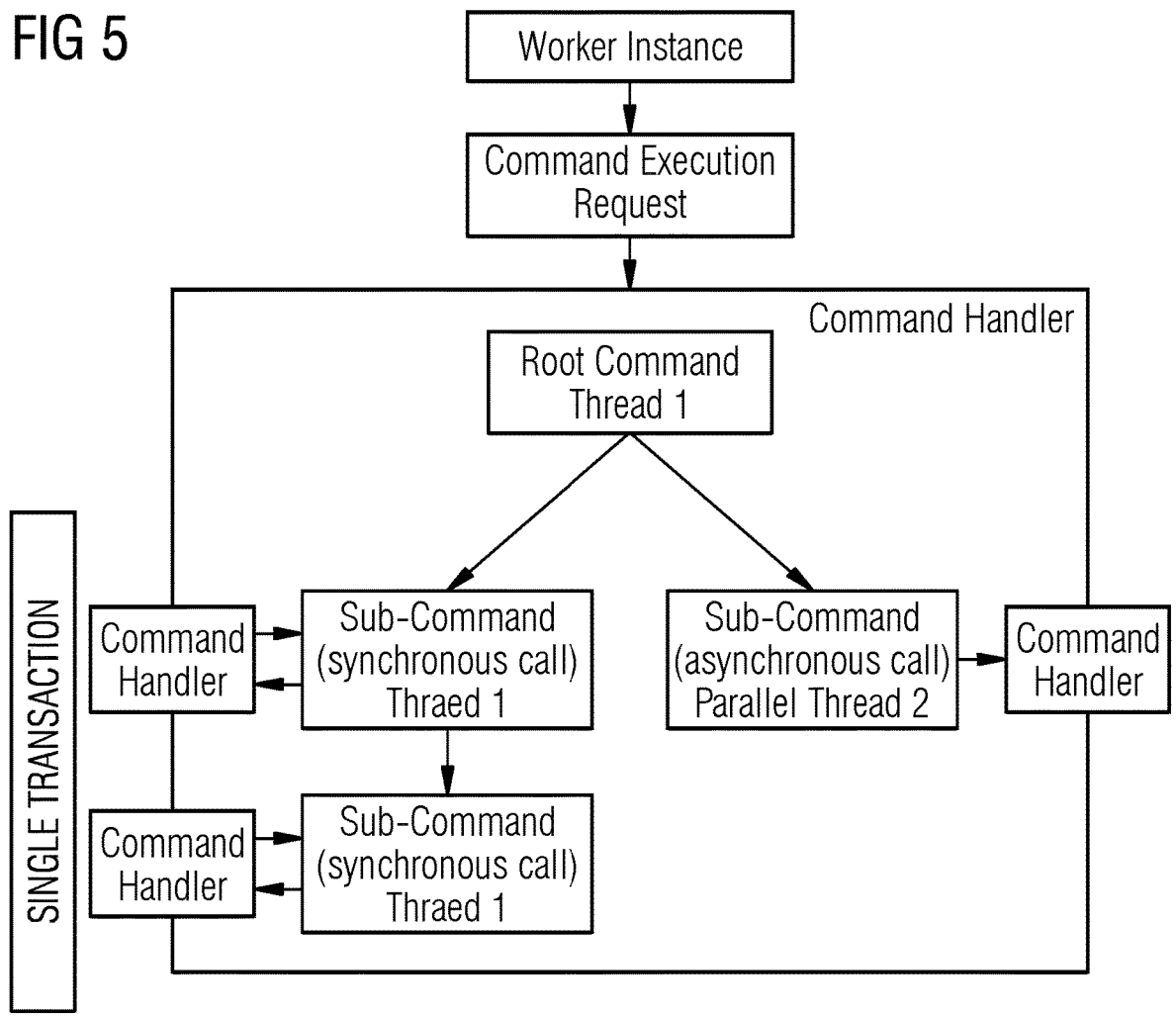
FIG. 5 is an illustration showing a command execution scheme for the interaction with the ERMS.

FIG. 5 schematically illustrates a command execution scheme for the interaction with the ERMS 2. The ERMS exposes a set of commands that represents the only way to interact with the ERMS 2. FIG. 5 accordingly shows a worker instance managing the command execution request which is then executed at command handler level. The command handler retrieves the data by single transaction with the database.

Figure 6:
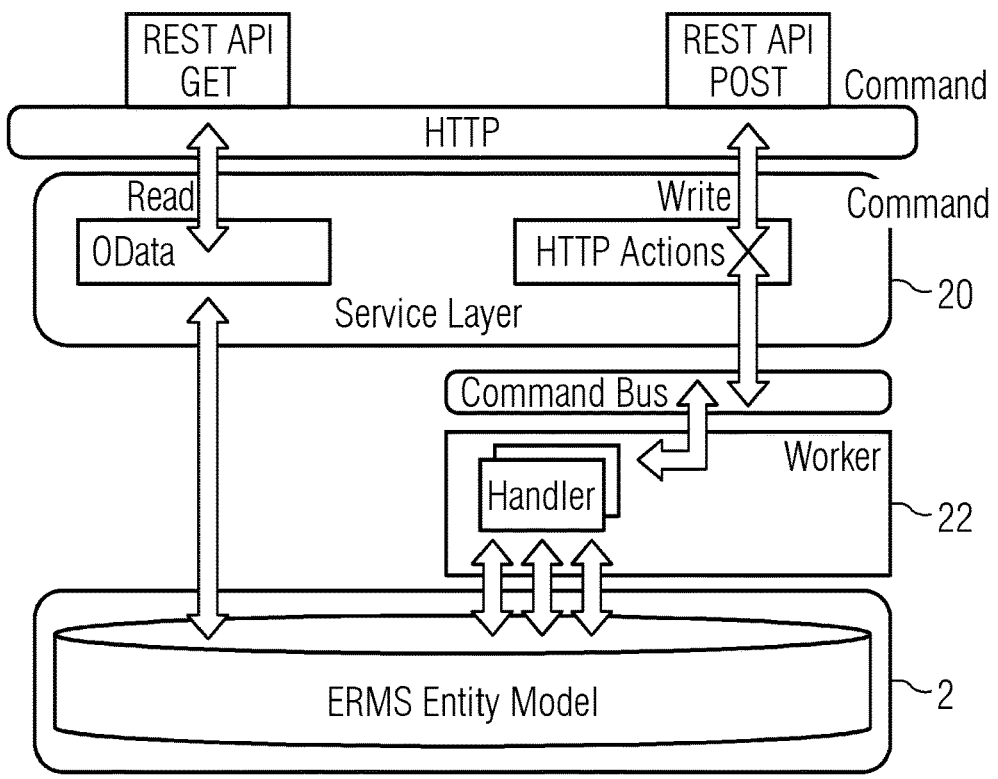
FIG. 6 is an illustration showing internal interaction components of the ERMS.

FIG. 6 schematically shows the internal interaction components of the ERMS 2. A typical workflow starts when an external application performs a request. A service layer 20 identifies a worker 22 being configured to execute the command; an instance of the worker 22 executes the logic comprised in the command handler 24.

The present invention therefore discloses the design of the self-consistent ERMS 2 to correlate and expose production data, energy consumption data, resource consumption and energy costs in a manufacturing scenario. The aggregated data set allows managing production plan and scheduling to achieve energy efficiency and reduce energy cost. The design is highly flexible allowing the deployment of the system in several operative scenarios and inside different information systems. The main technical advantages are:

Correlate different types of data, usually coming from different, separate sources which are today processed by separate systems;

Compute the direct energy consumption curve for a given product lot;

Expose the data as a service on demand;

The exposed data is provided as real-time response;

Repeatable and automated system;

Operate in a single unit or in a distributed scenario;

Can be embedded in a third party application; and

Can be invoked as an external service in a distributed architecture.

This design makes it possible to achieve the following economic advantages:

Improve the energy efficiency (by reducing demand peaks and fluctuations); and

Reduce energy costs (by re-arranging and optimizing production steps according to the energy cost.

Figure 7:
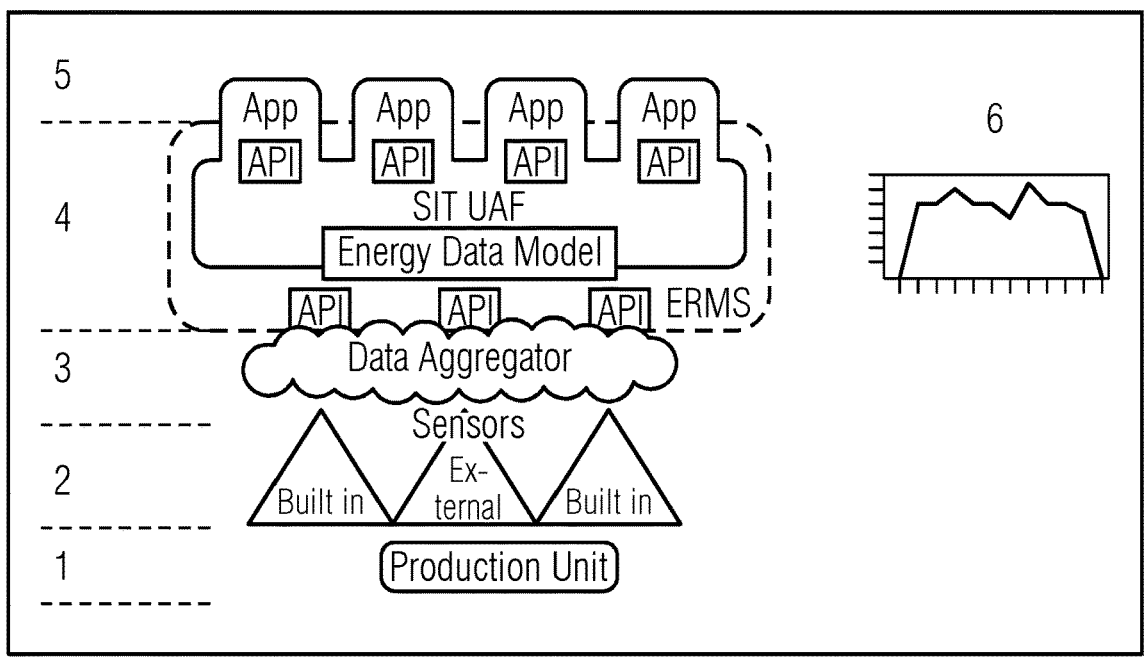
FIG. 7 is an illustration showing an implementation for the energy resource management system within the environment of a manufacturing execution system.

FIG. 7 schematically shows an implementation for the energy resource management system within the environment of a manufacturing execution system. The role of ERMS inside a production environment is described in short as follows.

At level 1, a Production Unit (or Production Line) is made by a set of equipment devoted to perform a specific production step. At level 2, each equipment has an energy meter (sensor) that provides the value of the energy consumed in a given production step. The sensor(s) can be embedded in the equipment or external to the equipment.

At level 3, any Raw Data coming from the sensors are stored in a common data repository (external to ERMS), such as the MES common data repository. At level 4, the ERMS API are used to fill the ERMS Data Model with Energy Data coming from the common data repository. Any process data are collected by the MES. The ERMS associates the Energy data and the Process data to the Lot, for each production step, to create the energy profile of the lot which can be displayed at level 6 on user interface of a plant operator. At level 5, External Applications can be connected to the ERMS to perform specific operations. The ERMS API(s) provides the respective data exchange. At level 6, the ERMS results are displayed as an Energy Consumption profile that associate to the product lot the values of the energy consumed in each step of the production. This Energy Consumption profile can therefore be used to optimize the production steps to achieve a production process aware of the lot-wise energy consumption. Typical measures could be to reduce energy consumption peaks and/or scheduling of production according to the energy cost profile that is applied by the respective energy supplier.

The invention claimed is:

1. A method for monitoring and/or controlling energy costs for a production of a product lot using a manufacturing execution system in a production plant having a plurality of production lines, which comprises the steps of:
   executing a production process being scheduled and controlled by the manufacturing execution system to produce the product lot, the production process having a number of scheduled production steps;
   measuring, for each individual production step, an energy consumption over a course of an execution of the individual production step for the product lot;
   creating a data model within the manufacturing execution system that correlates production specific data and energy consumption data related to the product lot;
   defining commands to manage the production specific data and the energy consumption data wherein the commands are configured as web application programming interfaces (APIs); and
   evaluating the production specific data and the energy consumption data and creating an energy consumption profile for the production process related to the product lot produced within the manufacturing execution system.

2. The method according to claim 1, which further comprises comparing the energy consumption profile to an energy cost profile.

3. The method according to claim 2, wherein a production scheduler uses a result of a comparison of the enemy consumption profile in order to adjust a scheduled order of at least one of the scheduled production steps.

4. The method according to claim 3, which further comprises linking the energy consumption data to the production specific data thereby determining an energy cost for the production of the product lot.

5. The method according to claim 1, wherein an energy and resource management system is provided as a self-consistent application that is embedded in the manufacturing execution system.

6. The method according to claim 5, wherein the energy and resource management system processes as input data the production specific data at runtime and the energy consumption data retrieved from sensors logically connected to production resources involved in the scheduled production steps and outputs an ordinated data set of the production specific data and the energy consumption data associated to the product lot for each of the scheduled production steps.

7. The method according to claim 1, wherein the manufacturing execution system provides information about which production resources are involved in a specific production step.

8. The method according to claim 1, wherein the web APIs are RESTful web APIs.

9. A non-transitory computer readable medium having computer-executable instructions for performing a method for monitoring and/or controlling energy costs for a production of a product lot using a manufacturing execution system in a production plant having a plurality of production lines, which method comprises the steps of:
- executing a production process being scheduled and controlled by the manufacturing execution system to produce the product lot, the production process having a number of scheduled production steps;
- measuring, for each individual production step, an energy consumption over a course of an execution of the individual production step for the product lot;
- creating a data model within the manufacturing execution system that correlates production specific data and energy consumption data related to the product lot;
- defining commands to manage the production specific data and the energy consumption data wherein the commands are configured as web application programming interfaces (APIs); and
- evaluating the production specific data and the energy consumption data and creating an energy consumption profile for the production process related to the product lot produced within the manufacturing execution system.

* * * * *